United States Patent

Aldridge et al.

Patent Number: 6,142,449
Date of Patent: Nov. 7, 2000

[54] APPARATUS SUITABLE FOR SECURING AN ARTICLE UNDER A VEHICLE

[75] Inventors: Lawrence Aldridge, Walled Lake, Mich.; Fletcher Bradford Ownbey, Thornton, Calif.

[73] Assignee: Valley Industries, Madison Heights, Mich.

[21] Appl. No.: 09/406,273

[22] Filed: Sep. 24, 1999

[51] Int. Cl.⁷ .................................................. B66D 1/00
[52] U.S. Cl. ..................... 254/323; 224/42.23; 414/466
[58] Field of Search ........................ 254/323; 224/42.12, 224/42.23, 42.24; 414/463, 466

[56] References Cited

U.S. PATENT DOCUMENTS

| | | | |
|---|---|---|---|
| 3,856,167 | 12/1974 | Yasue et al. | 214/451 |
| 4,884,785 | 12/1989 | Denman et al. | 254/389 |
| 5,188,341 | 2/1993 | Greaves | 254/323 |
| 5,975,498 | 11/1999 | Sauner | 254/323 |

*Primary Examiner*—Donald P. Walsh
*Assistant Examiner*—Emmanuel M. Marcelo
*Attorney, Agent, or Firm*—Rader, Fishman & Grauer PLLC

[57] ABSTRACT

An apparatus is provided that is suitable for securing an article (e.g., a spare tire and wheel assembly) suspended in an elevated position underneath a support article (e.g., a vehicle) by a resilient support member. The apparatus includes a stationary bracket, outer and inner members, a compression spring, and a catch member. The stationary bracket is connected to the support article and includes a retaining formation. The outer member includes a passageway, an inner seating surface, and at least one slot-like formation. The inner member, which includes an end surface, is telescopingly received within the outer member and is connected to the resilient support member. The compression spring is positioned between the inner seating surface of the outer member and the end surface of the inner member and biases the inner and outer members with respect to one another. The catch member is connected to the inner cylinder, and includes at least one outwardly biased member designed to pass through the slot-like formation of the outer member and engage the retaining formation of the stationary bracket should the resilient support member break or structurally fail in service. A method for using the apparatus is also provided.

18 Claims, 2 Drawing Sheets

APPARATUS SUITABLE FOR SECURING AN ARTICLE UNDER A VEHICLE

FIELD OF THE INVENTION

The present invention generally relates to an apparatus suitable for securing an article, such as a spare tire and wheel assembly, which is connected by a resilient support member to a support article, such as a vehicle chassis. More particularly, the present invention relates to an apparatus that includes a safety catch designed to secure the article in an elevated position above the ground or a defined non-vertical position in the event that a resilient support member breaks or mechanically fails in service. A method for using such an apparatus is also described.

BACKGROUND OF THE INVENTION

The prior art discloses several devices and assemblies that are used to retain a spare tire in a stored position underneath the chassis of a vehicle. A number of conventional devices include a spare tire carrier portion or assembly that is suspended by a resilient support member, such as a cable, chain, high-strength wire, rod, or other conventional support.

Some of the disadvantages of prevalent conventional systems are fragile interior linkages that may fail in service and often include a dependence upon frictional force to engage or disengage a safety catch. Other disadvantages include moveable parts that may freeze as a result of undesirable exposure to the change in the surrounding environment, including changes in the weather. In the event that the resilient member suspending the spare tire assembly breaks, it is advantageous to provide a reliable retaining device, such as a safety catch, to hold the spare tire in a secure elevated position above the ground. Further, the safety catch should be designed so that it may be engaged and disengaged each time the spare tire is raised and lowered.

SUMMARY OF THE INVENTION

The present invention recognizes the limitations associated with currently available vehicle-based safety retaining devices such as tire retainers. A principal feature of the present invention is its functionality. In essence, the weight of a secured article, such as a spare tire and wheel assembly, prevent the safety catch member from active engagement with a retaining means, thereby allowing the secured article to be normally retrieved and stored by the user. If the support member breaks or mechanically fails in service, the catch member is sprung into position to prevent the secured article from falling to the ground. Hence, the present invention provides a reliable secondary method for keeping an item such as a spare tire attached to a support article such as a vehicle chassis.

The present invention also provides the advantage of being predominantly self-contained while being in general alignment with the center of the article being secured. With such a configuration, there is no need for linkages across the secured article and unnecessary interference with other components. Moreover, the present invention is generally "hidden" from view and is further protected from a certain amount of exposure to the elements.

In accordance with an embodiment of the invention, an apparatus is provided that is suitable for securing an article in a suspended elevated position underneath a support article by a resilient support member. In one particular embodiment of the present invention, a spare tire and wheel assembly is secured beneath a vehicle chassis. The apparatus includes a stationary bracket, outer and inner members, a compression spring, and a catch member. The stationary bracket is connected to the support article and includes a retaining formation. The outer member includes a passageway, an inner seating surface, and at least one slot-like formation. The inner member, which includes an end surface, is telescopingly received within the outer member and is connected to the resilient support member. The compression spring is positioned between the inner seating surface of the outer member and the end surface of the inner member and biases the inner and outer members with respect to one another. The catch member is connected to the inner cylinder, and includes at least one outwardly biased member designed to pass through the slot-like formation of the outer member and engage the retaining formation of the stationary bracket should the resilient support member break or structurally fail in service. The present invention includes a method for using such an apparatus.

BRIEF DESCRIPTIONS OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Figure 1:
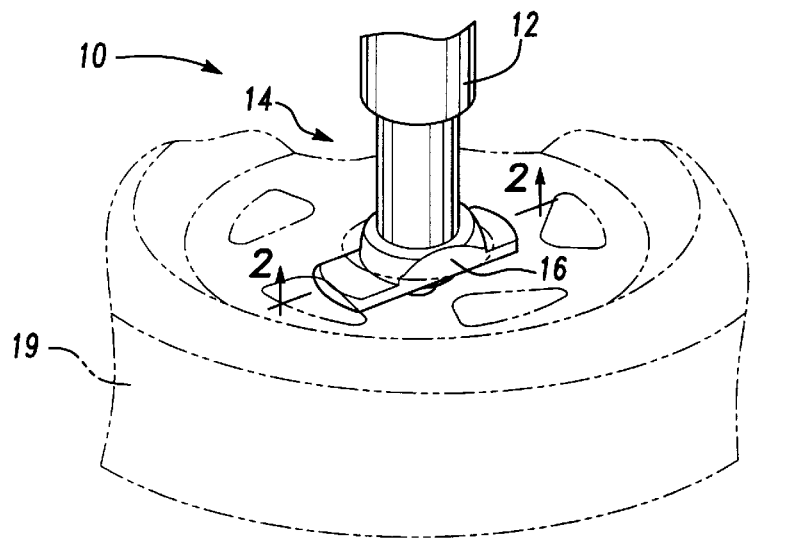
FIG. 1 is a perspective view of the exterior of an assembly including a preferred embodiment of the present invention.

FIG. 1 illustrates a perspective view of an article-securing mechanism such as a spare tire retaining assembly 10 that includes a preferred embodiment of the present invention. The assembly 10 is comprised of an apparatus 14 in accordance with the present invention and a carrier bracket for supporting an article, such as a spare tire (not shown).

Figure 2:
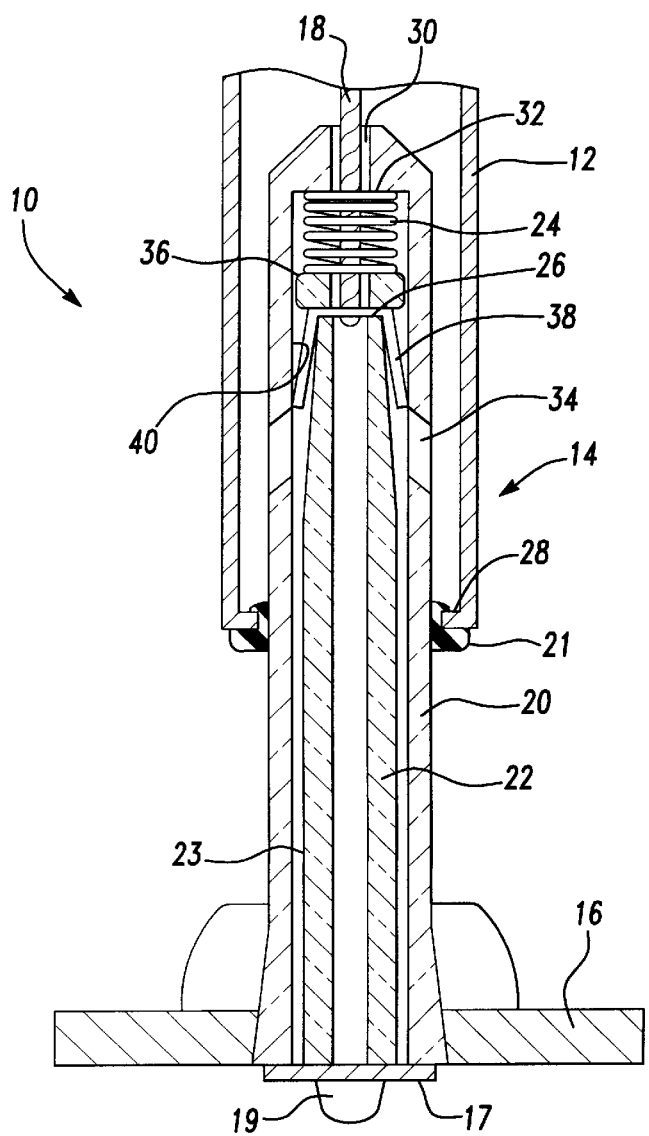
FIG. 2 is a cross section view of the assembly shown in FIG. 1 taken along lines 2—2.

FIG. 2 is a cross section view of the assembly 10 taken along lines 2—2 of FIG. 1. As illustrated in the aforementioned figures, a preferred embodiment of the present invention includes a stationary bracket 12, a resilient support member 18, an outer member 20, an inner member 22, a compression spring 24, and a catch member 26.

The stationary bracket 12 is rigidly connected to a portion of a support article, e.g., the underside of a vehicle chassis, and includes a retaining formation 28. In a preferred embodiment, the retaining formation 28 includes an inwardly extending annular flange. However, other structural formations designed to engage and retain the catch member 26 upon failure of the resilient support member 18 are also contemplated by the present invention.

The resilient support member 18 is used to primarily support or secure an article such as a tire 19 that is positioned on a carrier bracket 16. In a preferred embodiment, the carrier bracket 16 includes a washer 17 and a locking device 19, such as a nut or a wing nut. The support member 18 is preferably comprised of a cable, and more preferably a threaded cable. However, the support member 18 may instead be comprised of other conventional supports, including without limitation, a high-strength wire, a chain, a thin rod, other types of cables, or other known substitutes.

As illustrated, at least a portion of the outer member 20 is positioned within the stationary bracket 12 and above the retaining formation 28. The outer member 20 includes a generally cylindrical passageway 30 through which the resilient support member 18 passes, an inner seating surface 32 positioned near the upper end of the outer member 20, and at least one slot-like formation 34 in the side of the outer member 20 positioned below the inner seating surface 32. In a preferred embodiment of the present invention, the carrier bracket 16 is connected to the outer member 20. In an alternately preferred embodiment, the carrier bracket 16 is integrally formed with the outer member 20.

The inner member 22 includes an end surface 36 and is telescopingly received within the outer member 20. The inner member is connected to the resilient support member 18. It preferably has a shape designed to compliment the inner surface cavity of the outer member 20, but is sized so as to prevent binding with the outer member 20. As shown in FIG. 2, a continuous gap 23 exists between inner member 22 and outer member 20 along their respective lengths. Gap 23 can be minimized so long as the inner member 22 can properly move relative to the outer member 20.

In a preferred embodiment, the outer member 20 and inner member 22 are both generally cylindrical. However, the present invention is not limited to a configuration of a specific shape and any number of interrelated configurations of the inner and outer members 22, 20 may be used in accordance with the principles of the invention. For instance, the outer and inner members 20, 22 may instead be generally square or rectangular, if desired.

The compression spring 24 is positioned between the end surface 36 of the inner member 22 and the inner seating surface 32 of the outer member 20 to mechanically bias the inner member 22 and outer member 20 with respect to one another. A catch member 26 in connection with the inner member 22 includes at least one outwardly biased member 38. While the support member 18 is intact and the catch member 26 is positioned within the outer member, the outwardly biased member 38 of the catch member 26 is generally in a radially compressed, or "cocked," position having a reduced radial extent. The outwardly biased member 38 of the catch member 26 is designed to expand outwardly to an increased radial extent if and when the catch member 26 is vertically lowered to a position in which the outwardly biased member 38 is no longer so restricted by the walls of the outer member 20, such as when the outwardly biased member 38 comes into contact with the slot-like formations 34 of the outer member 20. Because it is desirable to be able to "reset" the apparatus for subsequent use, it is preferred that the radial extent of the "expanded" outwardly biased member 38 not be so great when "activated" so as to bind the catch member 26 to the walls of the stationary bracket 12.

In a preferred embodiment of the present invention, the outwardly biased member 38 is designed to pass through the slot-like formations 34 of the outer member 20. Upon a given amount of downward vertical movement, the outwardly biased member 38 will engage the retaining formation 28 of the stationary bracket 12 to prevent further downward vertical movement of the apparatus 14, and consequently the spare tire and wheel assembly.

In normal service and operation, the weight of the spare tire exerts a downward force on the outer cylinder 20. The tension of the support member 18 counteracts the downward force and exerts an upward force on the inner cylinder 22. The catch member 26 is preferably positioned through the inner cylinder 22, which is received within the outer cylinder 20. The compression spring 24 is compressed between the inside cylinder 22 and the outer cylinder 12 when the spare tire exerts a downward force on the outer cylinder 12 and the support member 18 exerts an upward force on the inner cylinder 22.

Figure 3:
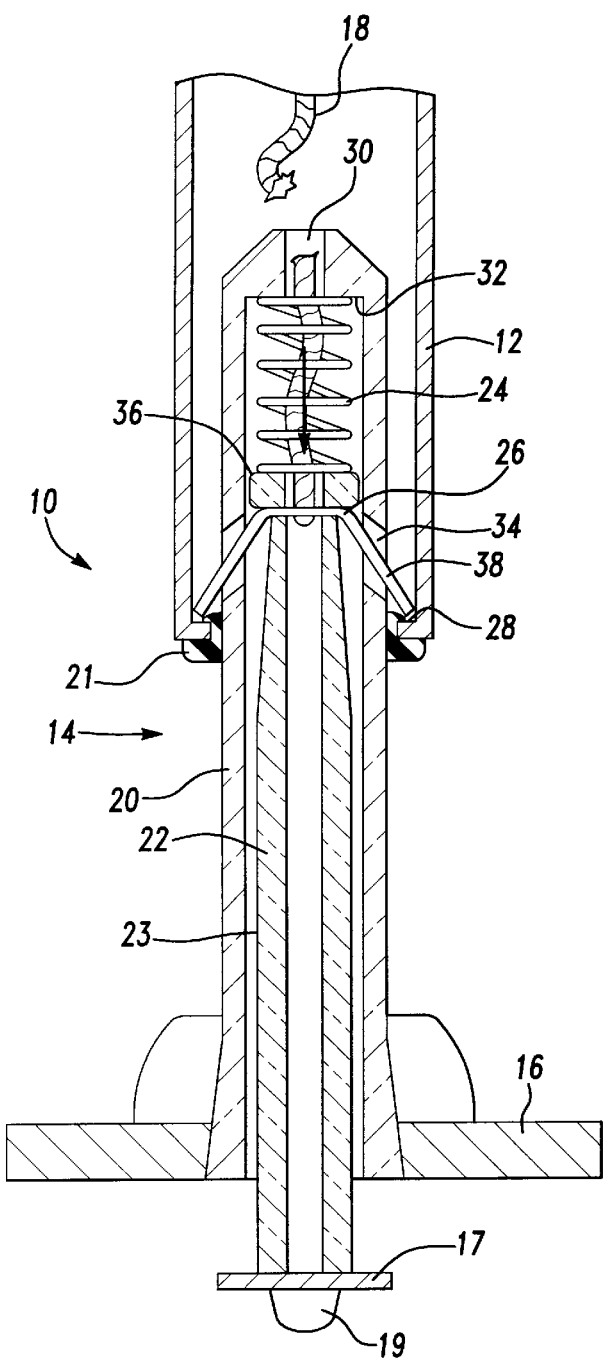
FIG. 3 is a cross section view of the assembly shown in FIG. 2, wherein the resilient member has failed.
Figure 4:
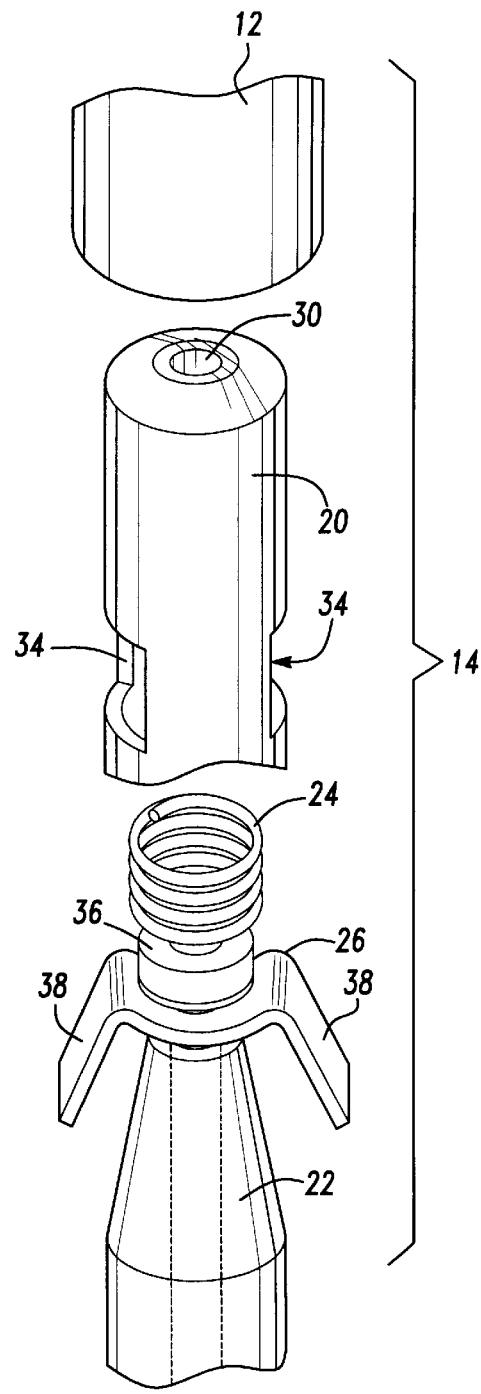
FIG. 4 is an assembly view of an alternative preferred embodiment of the present invention.

If the support member 18 fails in service or breaks, the compression spring 24 launches the inner cylinder 22 down within the outer cylinder 12. The slot-like formation 34 of the outer member 20 then allows the outwardly biased member 38 of the catch member 26 to exit and protrude past the outer cylinder wall. The outwardly biased member 38 of the catch member 26 will "catch" or engage a retaining formation 28 of the stationary bracket 12 to prevent further relative displacement between the inner and outer members 22, 20, and hence, the carrier bracket 16 from falling further from the stationary bracket 12. The preferred engagement of the outwardly biased member 38 and the retaining formation 28 of the stationary bracket is illustrated in FIG. 3. FIG. 4 is an assembly view of a preferred embodiment of the present invention in which the support member 18 has been intentionally omitted for clarity.

The catch member 26 and, more particularly, the outwardly biased member 38 must be sufficiently rigid and strong from a material standpoint to resist the downward pull and shearing forces encountered in the event that the outwardly biased member 38 forcefully engages the walls of the stationary bracket 12 and retaining formation 28. To provide a more gradual engagement between the outwardly biased member 38 and the retaining formation 28, the inner wall surface 40 of the outer member 20 positioned between the starting position of the catch member 26 and the slot-like formation 34 may optionally include additional surface deformations, such as a roughened or serrated portion, designed to slow, but not necessarily halt, the downward movement of the inner member 22 upon failure of the support member 18. Such a reduction in the downward velocity of the catch member 26 and inner member 20 helps to reduce the shear force or "shock" in the event of a mechanical failure of the support member 18, and may potentially provide the apparatus 14 with additional reliability.

If desired, the apparatus 14 may also include at least one conventional seal to protect the internal components of the apparatus 14 from dirt and other outside environmental concerns, such as water, moisture, oil, and the like. For example, an optional seal 21 can be used to prevent dirt and other outside environmental concerns from entering the internal working components of the apparatus 14 through the small space provided between the stationary bracket 12 and the outer member 20. Such a seal may provide further function and reliability to the assembly 10.

While the apparatus of the present invention has been discussed and described in terms of supporting a spare tire of a vehicle, it is important to point out that the apparatus is not limited to such a use. Moreover, an apparatus as described in accordance with the present invention may have a number of other uses in connection with other configurations in which an article of a sufficient weight to balance the system is to be supported or secured. Furthermore, the present invention is not limited to configurations that are aligned in a vertical configuration.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. An apparatus suitable for securing a spare tire and wheel assembly suspended in an elevated position underneath a vehicle by a resilient support member, said apparatus comprising:

a stationary bracket connected to the body portion of the vehicle, said stationary bracket including a retaining formation;

an outer member including a passageway for the resilient support member to pass through, an inner seating surface, a wall having an inner wall surface and an outer wall surface, and at least one slot-like formation extending through said wall between said inner wall surface and said outer wall surface;

an inner member having an end surface, said inner member being connected to the resilient support member and telescopingly received within said outer member;

a spring positioned between said inner seating surface of said outer member and said end surface of said inner member for biasing the inner and outer members with respect to one another; and a catch member in connection with said inner member, wherein said catch member includes at least one outwardly biased member designed to selectively pass through said slot-like formation and to engage said retaining formation should the resilient member structurally fail.

2. An apparatus as recited in claim 1, including a carrier bracket designed to secure a spare tire.

3. An apparatus as recited in claim 2, wherein said carrier bracket includes a locking device.

4. An apparatus as recited in claim 3, wherein said locking device is a nut.

5. An apparatus as recited in claim 4, wherein said locking device includes a washer.

6. An apparatus as recited in claim 1, wherein said retaining formation includes an inwardly extending annular flange.

7. An apparatus as recited in claim 1, wherein said inner and outer members are generally cylindrical.

8. An apparatus as recited in claim 1, wherein a portion of said inner wall surface of said outer member between said inner seating surface and said slot-like formation includes a surface deformation.

9. An apparatus as recited in claim 1, wherein said apparatus includes a seal to protect the components of the apparatus contained within said stationary bracket from undesirable outside elements.

10. An apparatus as recited in claim 9, wherein at least one seal is positioned in close proximity to a space formed between said stationary bracket and said outer member.

11. An apparatus suitable for securing an article exerting a force away from the apparatus and secured to a support article by a resilient support member, said apparatus comprising:

a stationary bracket connected to a support article, said stationary bracket including a retaining formation;

an outer member including a passageway for the resilient support member to pass through, an inner seating surface, a wall having an inner wall surface and an outer wall surface, and at least one slot-like formation extending through said wall between said inner and said outer wall surface;

an inner member having an end surface, said inner member being connected to the resilient support member and telescopingly received within said outer member;

a spring positioned between said inner seating surface of said outer member and said end surface of said inner member for biasing the inner and outer members with respect to one another; and a catch member in connection with said inner member, wherein said catch member includes at least one outwardly biased member designed to selectively pass through said slot-like formation and to engage said retaining formation should the resilient member structurally fail.

12. An apparatus as recited in claim 11, wherein said retaining formation includes an inwardly extending annular flange.

13. An apparatus as recited in claim 11, wherein said inner and outer members are generally cylindrical.

14. An apparatus as recited in claim 11, wherein a portion of said inner wall surface of said outer member includes a surface deformation.

15. An apparatus as recited in claim 11, wherein said apparatus includes a seal to protect the components of the apparatus contained within said stationary bracket from undesirable outside elements.

16. An apparatus as recited in claimed 15, wherein at least one seal is positioned in close proximity to a space formed between said stationary bracket and said outer member.

17. A method for securing an article connected by a support member to a support article, including the steps of:

providing an apparatus including (i) a stationary bracket connected to a support article, said stationary bracket including a retaining formation; (ii) an outer member including a passageway for the resilient support member to pass through, an inner seating surface, a wall having an inner wall surface and an outer wall surface, and at least one slot-like formation extending through said wall between said inner and said outer wall surface; (iii) an inner member having an end surface, said inner member being connected to the resilient support member and telescopingly received within said outer member; (iv) a spring positioned in a compressed configuration between said inner seating surface of said outer member and said end surface of said inner member for biasing the inner and outer members with respect to one another; and (v) a catch member in connection with said inner member, wherein said catch member includes at least one outwardly biased member designed to selectively pass through said slot-like formation; and, at least partially decompressing the spring upon the disconnection of said support member so as to at least partially force said catch member into position relative to said slot-like formation whereby said outwardly biased member extends through said slot-like formation and engages said stationary bracket.

18. A method as recited in claim 17, wherein said outwardly biased member engages said retaining formation of said stationary bracket.

* * * * *